(12) United States Patent
Bailey (10) Patent No.: US 11,848,470 B2
(45) Date of Patent: *Dec. 19, 2023

(54) DOCSIS-MOCA COUPLED LINE DIRECTIONAL COUPLER

(71) Applicant: PPC BROADBAND, INC., East Syracuse, NY (US)

(72) Inventor: Paul Bailey, Camillus, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,770

(22) Filed: Aug. 22, 2022

(65) Prior Publication Data

US 2022/0393332 A1 Dec. 8, 2022

Related U.S. Application Data

(63) Continuation of application No. 17/165,237, filed on Feb. 2, 2021, now Pat. No. 11,424,524.

(60) Provisional application No. 62/969,554, filed on Feb. 3, 2020.

(51) Int. Cl.
*H01P 5/18* (2006.01)
*H04B 10/2575* (2013.01)
*H01P 3/08* (2006.01)

(52) U.S. Cl.
CPC ............. *H01P 5/18* (2013.01); *H01P 3/081* (2013.01); *H04B 10/25751* (2013.01)

(58) Field of Classification Search
CPC ............. H01P 5/18; H01P 5/185; H01P 3/081
See application file for complete search history.

(56) References Cited

U.S. PATENT DOCUMENTS

| 8,558,640 | B2* | 10/2013 | Hirai | H01P 5/185 |
| | | | | 333/116 |
| 11,038,250 | B1* | 6/2021 | Menna | H04N 21/6118 |
| 2013/0061276 | A1 | 3/2013 | Urban | |
| 2017/0077697 | A1 | 3/2017 | Girard et al. | |
| 2018/0288463 | A1 | 10/2018 | Shapson et al. | |
| 2018/0351268 | A1 | 12/2018 | Krapp et al. | |
| 2019/0081661 | A1 | 3/2019 | Krapp et al. | |
| 2019/0222800 | A1 | 7/2019 | Bailey | |
| 2019/0230399 | A1 | 7/2019 | Bailey | |

OTHER PUBLICATIONS

Lee Young (Authorized Officer), International Search Report and Written Opinion dated Apr. 14, 2021, PCT Application No. PCT/US2021/016186, 9 pages.

* cited by examiner

*Primary Examiner* — Andrea Lindgren Baltzell
*Assistant Examiner* — Kimberly E Glenn
(74) *Attorney, Agent, or Firm* — MH2 TECHNOLOGY LAW GROUP LLP (57) ABSTRACT

A Docsis-MoCA coupled line directional coupler includes an input port, an output port, a coupled port, and a termination port. A first track connects the input port to the output port and a second track, which may be substantially parallel to the first track, connects the termination port to the coupled port. The first track and the second track are configured to form a variable coupling length so as to control, for instance, an isolation level between the output port and the coupled port to be less than a predetermined isolation level in a MoCA frequency band.

20 Claims, 6 Drawing Sheets

DOCSIS-MOCA COUPLED LINE DIRECTIONAL COUPLER

CROSS-REFERENCE TO RELATED APPLICATIONS

This application is a continuation of and claims priority to U.S. patent application Ser. No. 17/165,237, which was filed on Feb. 2, 2021, which claims priority to U.S. Provisional Patent Application, 62/969,554, which was filed on Feb. 3, 2020, both of which are incorporated herein by reference in their entirety.

BACKGROUND

Data Over Cable Service Interface Specification (DOCSIS) is an international telecommunications standard that permits the addition of high-bandwidth data transfer to an existing cable television (CATV) system. DOCSIS is used by many cable television operators to provide Internet access over their existing hybrid fiber-coaxial (HFC) infrastructure. The Multimedia over Coax Alliance (MoCA) is an international standards consortium that publishes specifications for networking over coaxial cable. DOCSIS may be useful for providing network content via home cable TV subscriber devices (e.g., digital video recorders (DVRs), set-top boxes, digital television tuners, etc.). Also, MoCA may be useful to allow network devices and/or home cable TV subscriber devices to communicate with each other over a wired coaxial connection.

MoCA filtering is a technique used to prevent communications between devices in a home network from exiting the home network and reaching the CATV network or external network. Such filtering is often used to preserve the privacy of the communications occurring within the home network and more specifically, to prevent communications, intended only for devices within the home network, from leaving the home network and being observable from outside the home network.

A challenge in using Docsis to provide cable TV and Ethernet signals to and from the home and MoCA signals for networking of data within the home is providing sufficient isolation between the cable signals and the Internet or other signals and controlling insertion loss and return loss within the home. An additional challenge is preventing noise funneling of interference signals in the Docsis band escaping from the home where the aggregate sum noise from multiple homes could degrade the CATV signals in the network. Many in home cable architectures now use products that help to improve isolation between CATV access network signals and In-home network signals while also suppressing or minimizing noise ingress.

SUMMARY

A Docsis-MoCA coupled line directional coupler includes an input port, an output port, a coupled port and a termination port. A first track connects the input port to the output port and a second track substantially parallel to the first track connects the termination port to the coupled port. A coupling length between the first track and the second track is set so as to control an isolation level between the output port and the coupled port to be less than a predetermined isolation level in a MoCA frequency band.

In some embodiments, a resistor is connected between a ground and the second track, and a connection position of the resistor to the second track along a length of the second track is set to control the coupling length between the first track and the second track.

In some embodiments, a coupling length between the first track and the second track is set so as to control an isolation level between the input port and the coupled port being set to be less than a second predetermined isolation level at a Docsis frequency band and an isolation level between the input port and the coupled port being set be less than a third predetermined isolation level at the MoCA frequency band.

In some embodiments, a coupling length between the first track and the second track is set so as to control an insertion loss level between the input port and output port of less than a predetermined insertion loss level at a predetermined frequency.

In some embodiments, a coupling length between the first track and the second track is set so as to control one or more of: an isolation level between the output port and the coupled port to be less than a predetermined isolation level in a MoCA frequency band, an isolation level between the input port and the coupled port being set to be less than a second predetermined isolation level at a Docsis frequency band and an isolation level between the input port and the coupled port being set be less than a third predetermined isolation level at the MoCA frequency band, and an insertion loss level between the input port and output port of less than a predetermined insertion loss level at a predetermined frequency.

In some embodiments, the coupling length between the first track and the second track may be set to provide a more uniform isolation level between the output port and the coupled port, and/or between the input port and the coupled port as well as an improved insertion loss between the input port and the output port.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Aspects of the present disclosure may include a Docsis-MoCA coupled line directional coupler that improves the performance of hybrid and MoCA only communications by improving insertion loss and isolation between the ports. Further, the performance of the Docsis-MoCA coupled line directional coupler may be adjusted or set when the Docsis-MoCA coupled line directional coupler is manufactured, as further explained herein.

Additionally, in some embodiments, a coupling length of lines or tracks in the Docsis-MoCA coupled line directional coupler may be adjustable by adjusting a connecting position of a resistor to one of the tracks, thereby adjusting the isolation, transition frequency and insertion loss. The coupling length may be defined by a portion of the first track and the second track that may be, but is not limited to, being in parallel with each other and through which the signal is actively coupled.

As described herein, the Docsis-MoCA coupled line directional coupler may include a splitter design with tuned MoCA frequency band (e.g., 1125-1675 MHz) performance and may be constructed and/or optimized using standard PCB materials. In some embodiments, these materials may include a PCB with FR4 (flame retardant woven glass reinforced epoxy resin), a PCB thicknesses of about 30-62 mil and performance in the Docsis & MoCA frequency bands (e.g. 5-1002 MHz & 1125-1675 MHz). The Docsis-MoCA coupled line directional coupler described herein may have a microstrip symmetrical coupled line design that improves the thermal behavior, insertion loss and directional isolation in the Docsis & MoCA frequency bands (e.g. 5-1002 MHz & 1125-1675 MHz) relative to the thermal behavior, insertion loss and directional isolation of traditional toroidal couplers.

Referencing a single stage Docsis-MoCA coupled line directional coupler with microstrip symmetrical coupled line design, specific design characteristics may be optimized in the Docsis & MoCA frequency bands (e.g. 5-1002 MHz for Docsis and 1125-1675 MHz for MoCA) through simulation and prototype iterations. Example design characteristics that may be optimized may include stage quantity, microstrip track widths, coupling lengths, clearances, resistance values, resistor location, straight line, dual line and folded line layouts such that devices are suitable for Docsis-MoCA dual network applications within the example frequency range of 5-1002 MHz and 1125-1675 MHz.

As described herein, in some embodiments, the Docsis-MoCA coupled line directional coupler may include a single stage microstrip symmetrical coupled line design. In some embodiments, the directional coupler may be formed on a PCB. In some embodiments, the Docsis-MoCA coupled line directional coupler includes: an input port, an output port, a coupled port and a termination port, a first track connecting the input port to the output port, and a second track substantially parallel to the first track connecting the termination port to the coupled port. A coupling length between the first track and the second track may be set to provide the Docsis-MoCA coupled line directional coupler with an isolation level between the output port and the coupled port that can be controlled. In some embodiments, the isolation level between the output port and the coupled port may be controlled (by setting the coupling length) to be less than a first predetermined isolation level, such as less than about 8 dB at a MoCA frequency band, such as 1125-1675 MHz.

In some embodiments, the first track and the second track are configured to form a coupling length based on a resistor connection position relative to or along a length of the second track. In some embodiments the first track and the second track may be configured to form different coupling lengths. For example, the first track and the second track may be configured to form a first coupling length, a second coupling length, a third coupling length, etc, by the use of different connection positions of the resistor along the second track. The different coupling lengths can provide different levels of isolation between the ports as described herein, as well as different levels of insertion loss.

The coupling length may also be set to provide the Docsis-MoCA coupled line directional coupler with one or more of: 1) an isolation level between the input port and the coupled port of less than a second predetermined isolation level, such as less than about 35 dB at a Docsis frequency band, such as about 5-1002 MHz, and less than a third predetermined isolation level, such as less than about 25 dB at a MoCA frequency band, such as 1125-1675 MHz in a standalone configuration; and 2) an insertion loss between the input port and the output port of less than a predetermined insertion loss level, such as about 1.5 dB at about 1200 MHz. In some embodiments, other predetermined isolation levels, insertion loss levels and frequency bands may be used. For example, an isolation level between the input port and the coupled port of less than about 40 dB at a Docsis frequency band may be used, and an isolation level between the input port and the coupled port of less than about 30 dB at a MoCA frequency band may be used. The coupling length can be set to provide other isolation levels as needed.

In some embodiments, the coupling length between the first track and the second track may be set to provide a more uniform isolation level between the output port and the coupled port, and/or between the input port and the coupled port, as further explained herein.

In some embodiments, in addition to the coupling length, a gap width between the first track and the second track and/or a width of the first track and a width of the second track may be set to control a value of one or more of the isolation between the output port and the coupled port, the insertion loss between the input port and the output port, and an isolation between the output port and the and coupled port. In some embodiments, the values of the gap width, the track width and other element details may be optimized for the Docsis and MoCA bandwidths.

In some embodiments, the track width may be about 14±1.5 mil; the gap between the first track and the second track may be about 5.5±1 mil; a clearance to ground may be 25 mil; the PCB thickness may be about 39 mil; and the coupling length of the first track and the second track may be about 1200 mil. A resistor may be connected between the second track and ground. The connection point of the resistor to the second track may be used to adjust the coupling length. In some embodiments, the resistor may have a resistance of about 75Ω.

In some embodiments, the values of the gap width, the track width, the clearance to ground, the PCB thickness and the value of the resistor may be set to nominal values (such as given in the preceding paragraph), and then the coupling length between the first track and the second track may be set to provide desired levels for one or more of: 1) a level of isolation between the input port and the coupled port; 2) a level of isolation between the output port and the coupled port; 3) a level of insertion loss between the input port and the output port; 4) a uniformity of the isolation between the input port and the coupled port across one or more frequency band (such as the herein described Docsis and MoCA frequency bands); and 5) a uniformity of the isolation between the output port and the coupled port across one or more frequency band (such as the herein described Docsis and MoCA frequency bands).

In some embodiments the Docsis-MoCA coupled line directional coupler may be modified such that the coupled lines may be folded to maintain design performance while using less space. In some embodiments, the Docsis-MoCA coupled line directional coupler may be modified by adjusting a connection position of the resistor along a length of the second track, effectively lengthening or shortening the coupling length of the first and second tracks. In some embodiments, the Docsis-MoCA coupled line directional coupler may be modified such that the performance is sustained for different PCB thicknesses and materials. While certain example characteristics, measurements, parameters, and specifications are described above, it is noted that in practice, variations are possible and aspects of the present disclosure are not limited to those characteristics, measurements, parameters, and specifications described herein.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
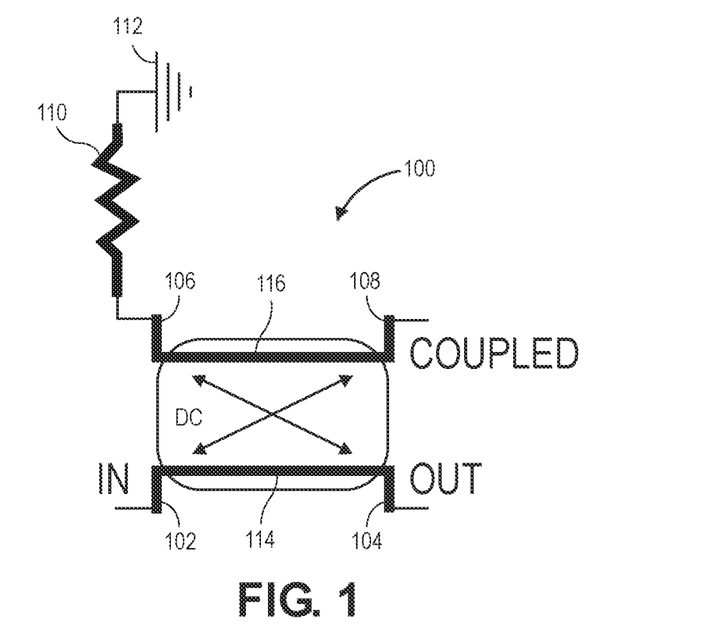
FIG. 1 illustrates an example Docsis-MoCA coupled line directional coupler in accordance with aspects of the present disclosure.

FIG. 1 illustrates an example Docsis-MoCA coupled line directional coupler 100 in accordance with aspects of the present disclosure. The Docsis-MoCA coupled line directional coupler 100 of FIG. 1 may include an input port 102, an output port 104, a termination port 106 and a coupled port 108. A resistor 110 may be connected between the termination port 106 and a ground 112. The input port 102 is connected to the output port 104 by a first track 114 and the termination port 106 is connected to the coupled port by a second track 116.

The Docsis-MoCA coupled line directional coupler 100 may be configured to receive a signal, such as an incoming or "downstream" cable TV signal, at the input port 102 and output the cable TV signal at the output port 104. Additionally, the coupled port is configured to couple MoCA signals to the Output Hybrid Port while isolating CATV Signals and MoCA signals from the input port. In some embodiments, the output port 104 may be a hybrid port that outputs both the cable TV signal and a MoCA data signal (see FIG. 7).

The Docsis-MoCA coupled line directional coupler 100 is configured to provide isolation between the output port 104 and the coupled port 108 (and between the output CATV signal and the MoCA signal output at the coupled port 108). As further described herein, the isolation between the output port 104 and the coupled port 108 is set to a desired isolation level by setting a coupling length between the first track 114 and the second track 116. In one example, the isolation between the output port 104 and the coupled port 108 may be set to 8 dB (although different levels of isolation may be used) at a MoCA frequency, such as at about 1125-1675 MHz.

The isolation level between the output port 104 and the coupled port 108 may be set by adjusting a coupling length between the first track 114 and the second track 116. For example, the coupling length may be set by connecting the resistor 110 to the second track 116 at one of various positions along a length of the second track 116. The coupling length can be lengthened or shortened in this manner. In some embodiments, the Docsis-MoCA coupled line directional coupler 102 may be connected to test equipment capable of measuring the isolation level, insertion loss, etc., and the resistor 110 can be moved along a length of the second track 116 to change the coupling length until the desired isolation level is achieved.

Setting the coupling length between the first track 114 and the second track 116 may also be used to set an isolation between the input port 102 and coupled port 108. In some embodiments, the isolation between the input port 102 and coupled port 108 may be set to less than about 35 dB at a DOCSIS frequency, such as about 5-1002 MHz and less than about 25 dB at a MoCA frequency, such as about 1125-1675 MHz, for example, although other isolation levels could be set.

Setting the coupling length between the first track 114 and the second track 116 may also be used to set an insertion loss between the input port 102 and output port 104. In some embodiments, the insertion loss may be set to less than about 1.5 dB at about 1200 MHz, for example.

In some embodiments, in addition to the coupling length between the first track 114 and the second track 116, other factors may affect the herein-described isolation values and insertion loss. These other factors may include a resistance value of resistor 110, a track width of the first and second tracks 114, 116, a gap between the first track 114 and the second track 116, a thickness of the printed circuit board on which the Docsis-MoCA coupled line directional coupler 102 is formed, a dielectric constant of the printed circuit board, and a loss tangent of the printed circuit board. However, if these other factors are fixed, the isolation levels and insertion loss may be adjusted based on a change in the coupling length.

In some embodiments, the Docsis-MoCA coupled line directional coupler 102 may be configured with the resistor 110 having a value of 75 ohms, the track width of the first track 114 and the second track 116 may be about 14 mil±1.5 mil, the gap between the tracks may be 5.5 mil±1 mil, the clearance to ground may be 25 mil. Other values for these elements may be used, but these values have been found to produce useful levels of isolation and insertion loss when used with a starting value of the coupling length of the first track 114 and the second track 116 of about 1200 mil, as further explained herein.

Figure 2:
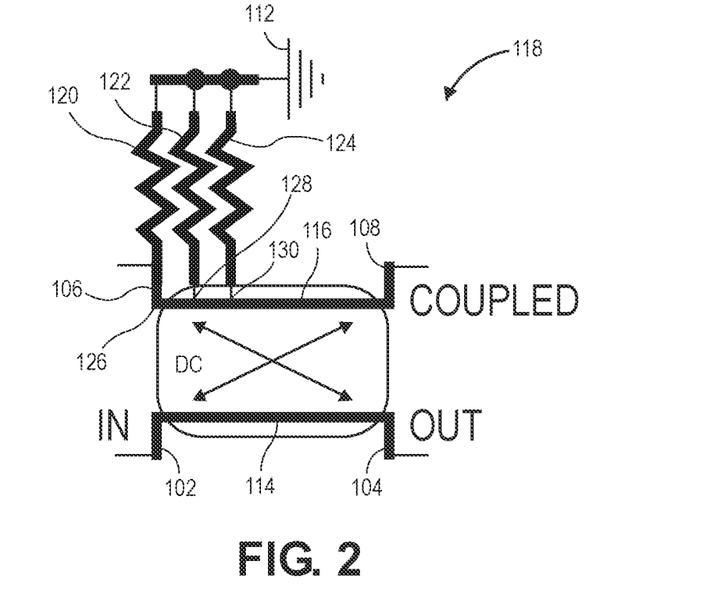
FIG. 2 illustrates an example adjustable Docsis-MoCA coupled line directional coupler in accordance with aspects of the present disclosure.

FIG. 2 illustrates an example Docsis-MoCA coupled line directional coupler 118 in accordance with aspects of the present disclosure. The Docsis-MoCA coupled line directional coupler 118 is shown with multiple resistor positions (e.g., three resistor positions) 120, 122, 124, but in practice one resistor may be moved to different positions 126, 128 and 130 along the length of second track 116. In some embodiments, the Docsis-MoCA coupled line directional coupler 118 could include multiple resistor positions that are at different connection points along the length of the second track 116, where one of the resistors are selectively connectable between the ground 112 and the second track 116 to change the coupling length of the tracks 114, 116.

Figure 3:
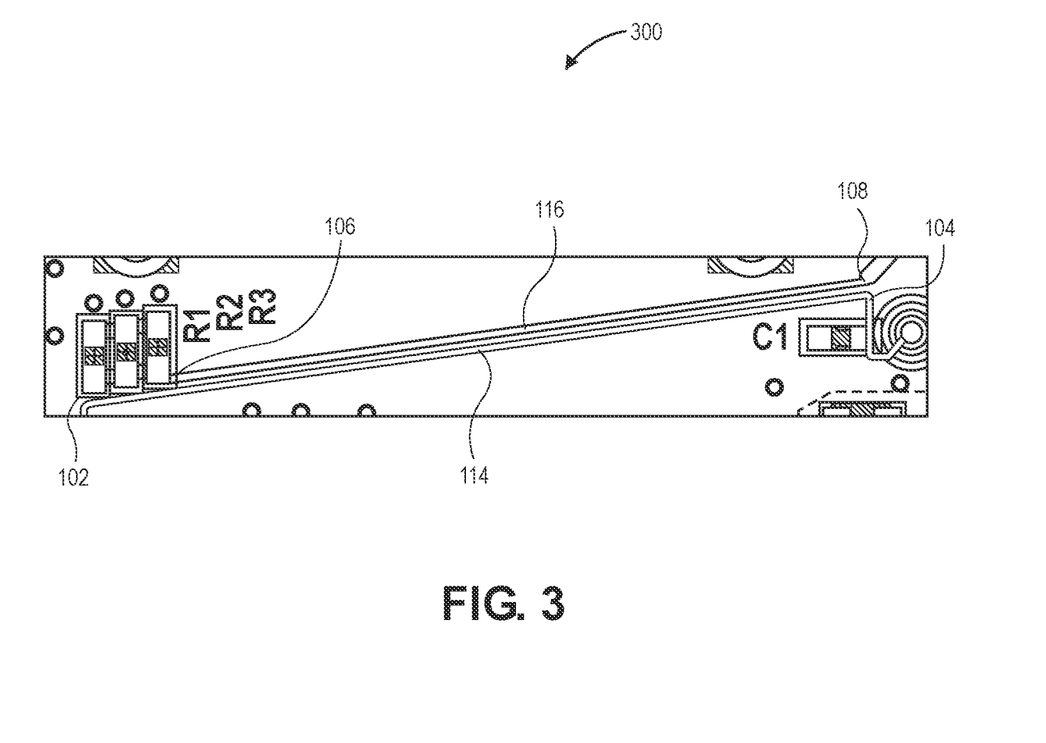
FIG. 3 illustrates a top view of an example PCB design for a Docsis-MoCA coupled line directional coupler in accordance with aspects of the present disclosure.

FIG. 3 illustrates a top view of an example printed circuit board (PCB) 300 for a Docsis-MoCA coupled line directional coupler in accordance with aspects of the present disclosure. The Docsis-MoCA coupled line directional coupler of FIG. 3 may have the coupling length between the first track 114 and the second track 116 set to provide the isolation and/or insertion loss described above. The coupling length is defined by the portion of the first track and the second track that are parallel and through which the signals are actively coupled. The position of the resistor along the second track can thus be used to adjust the coupling length.

Figure 4:
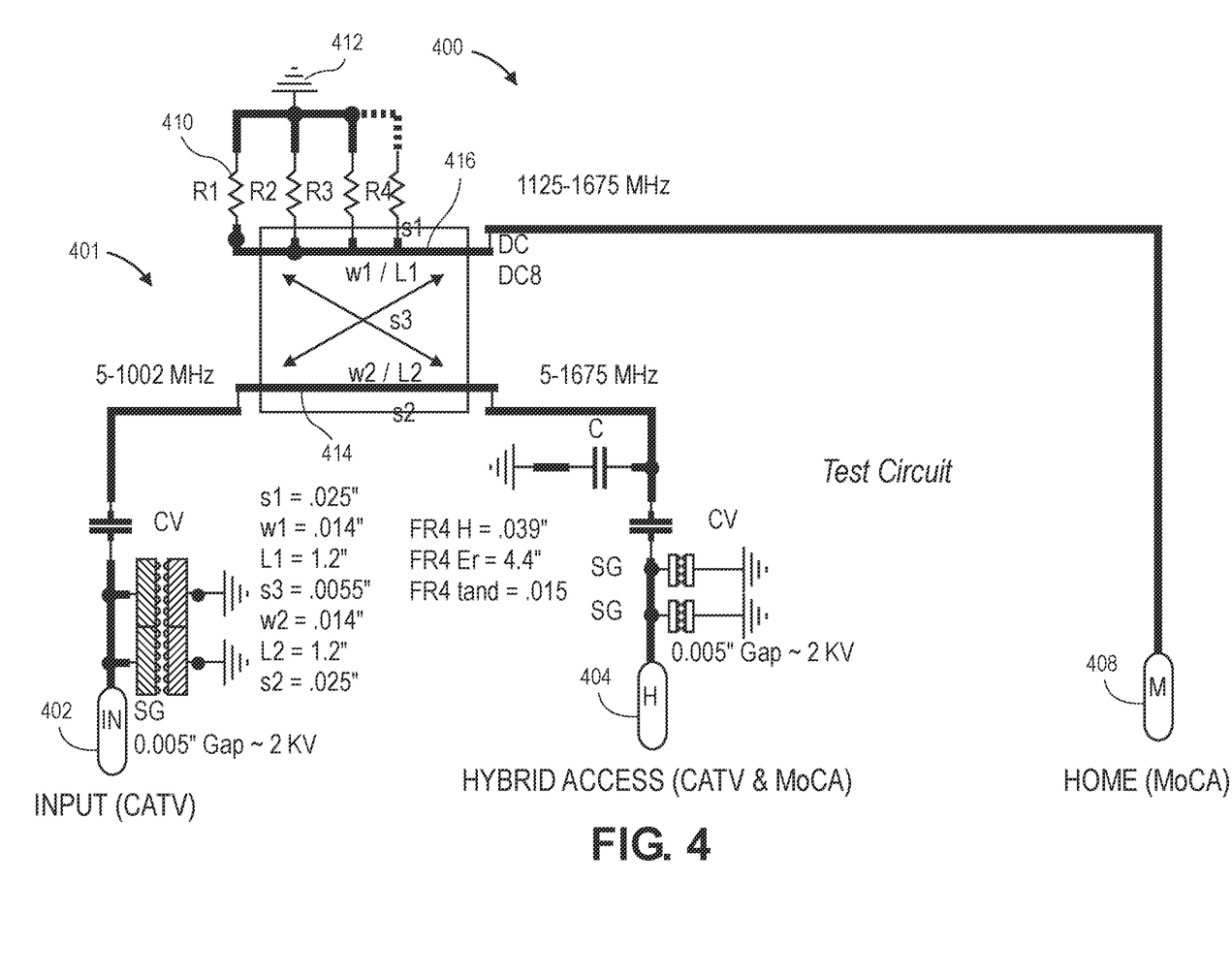
FIG. 4 illustrates an example adjustable Docsis-MoCA coupled line directional coupler implemented in a test circuit.

FIG. 4 illustrates an example adjustable Docsis-MoCA coupled line directional coupler 401 implemented in a test circuit 400. As shown in FIG. 4, the adjustable Docsis-MoCA coupled line directional coupler 401 may include an input port 402 that may be connected to an input source (e.g., a CATV input source) to receive input signals (e.g., input signals from a CATV provider or network, such as television signals for broadcasting television content). The Docsis-MoCA coupled line directional coupler 401 may be configured to connect to home subscriber devices (e.g., set-top boxes, television tuners, etc.) via an output port 404 to provide the home subscriber devices with connectivity to the CATV network and receive signals provided by the CATV network for the home subscriber devices to present television content. The output port 404 may also provide MoCA connectivity in which the home subscriber devices may communicate with each other via the MoCA protocol within the in-home network. The Docsis-MoCA coupled line directional coupler 401 may also include a coupled port 408 to provide MoCA only access in which the MoCA devices may communicate with each other while isolating them from the input port or the CATV network (e.g., to preserve privacy of the communications within the home network). A resistor 410 may be connected between ground 412 and a second track 416. A first track 414 is connected between the input port 402 and the output port 404.

Although resistors R1-R4 are shown in FIG. 4, the Docsis-MoCA coupled line directional coupler 401 may be configured with just one resistor connectable at different positions along a length of the second track 416, or may be configured with a plurality of resistors selectively connectable at different positions along a length of the second track 416 for adjusting the coupling length.

The test circuit 400 is configured to measure the isolation and insertion loss between the ports. The connection position of the resistor 410 to the track (by connecting the resistor 410 at different connection positions along the track) can then be adjusted to provide desired values for the isolation and insertion loss between the various ports, as described herein. The test circuit may be used to determine the nominal directional coupler design parameters and resistor placement to optimize isolation and insertion loss performance for various loads attached to the various ports such as splitters and cables. The reactance of these loads are what interact with the performance characteristics of the directional coupler.

As described herein, the Docsis-MoCA coupled line directional coupler 401, in accordance with aspects of the present disclosure, includes an improved design that improves the performance of hybrid and MoCA only communications by improving insertion loss and isolation levels and uniformity as compared to conventional devices.

Figure 5:
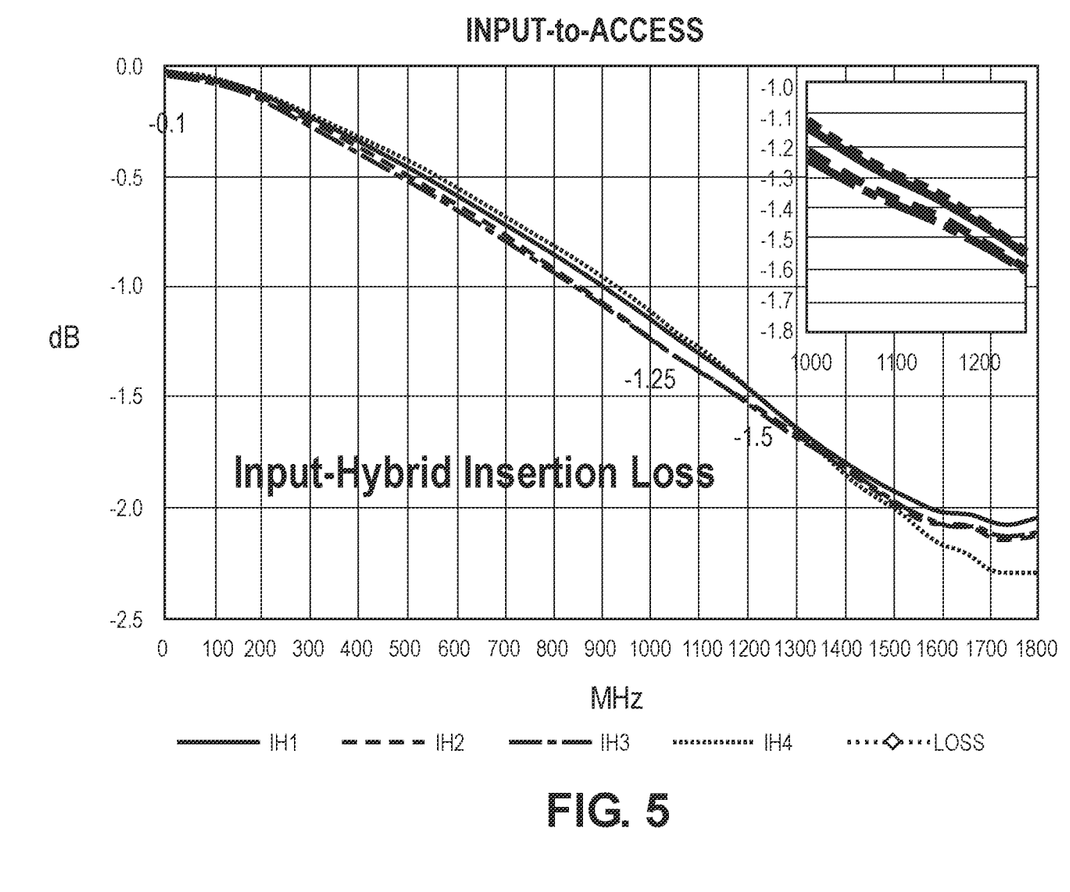
FIG. 5 illustrates a graph of the input to hybrid port insertion loss for the Docsis-MoCA coupled line directional coupler, in accordance with aspects of the present disclosure.

FIG. 5 illustrates a graph of the input to hybrid port (or output port) insertion loss for the Docsis-MoCA coupled line directional coupler 100, 401, at various coupling lengths such as 1050 mil to 1200 mil in accordance with aspects of the present disclosure. As can be seen in FIG. 5, the insertion loss is less than about 1.5 dB starting at 1200 mil.

Figure 6:
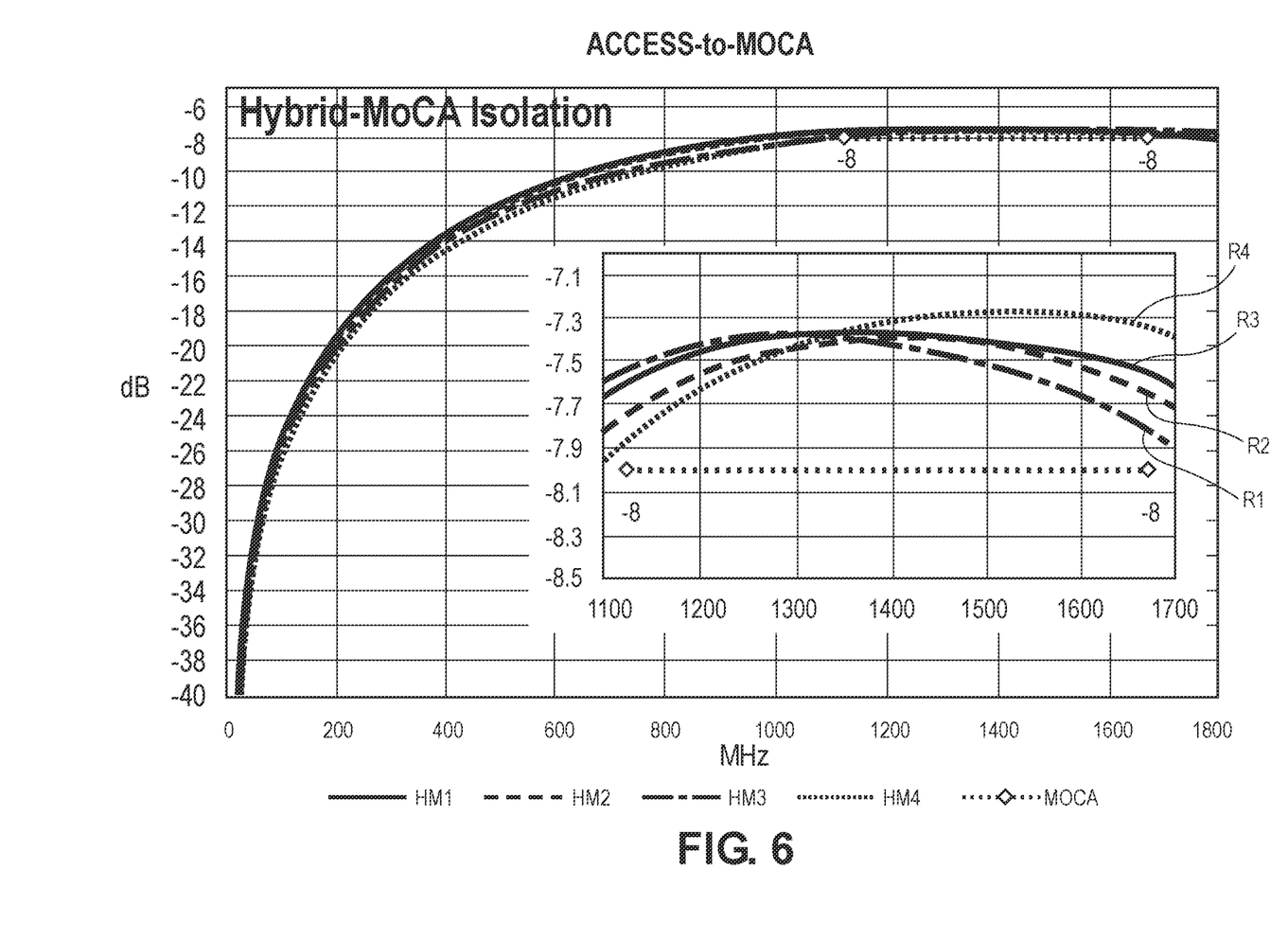
FIG. 6 illustrates a graph of the hybrid port to MoCA-only port isolation for the Docsis-MoCA coupled line directional coupler, in accordance with aspects of the present disclosure.

FIG. 6 illustrates a graph of the hybrid port (or output port) to MoCA-only port (or coupled port) isolation for different coupling lengths (represented as R1-R4) for the Docsis-MoCA coupled line directional coupler 100, 401, in accordance with aspects of the present disclosure. As can be seen in FIG. 6, the isolation is less than about 8 dB at about the MoCA frequency band of 1125 MHz to 1675 MHz for different R values. The coupled response between the output port (hybrid port) and the coupled port (MoCA only port) can be flattened by selecting the proper resistive position or track coupling length in conjunction with the series capacitance of the coupled port load. In FIG. 6, R2 is the flattest of the coupling lengths shown, and thus provides the highest level of uniformity of the isolation level across the MoCA frequency band.

Figure 7:
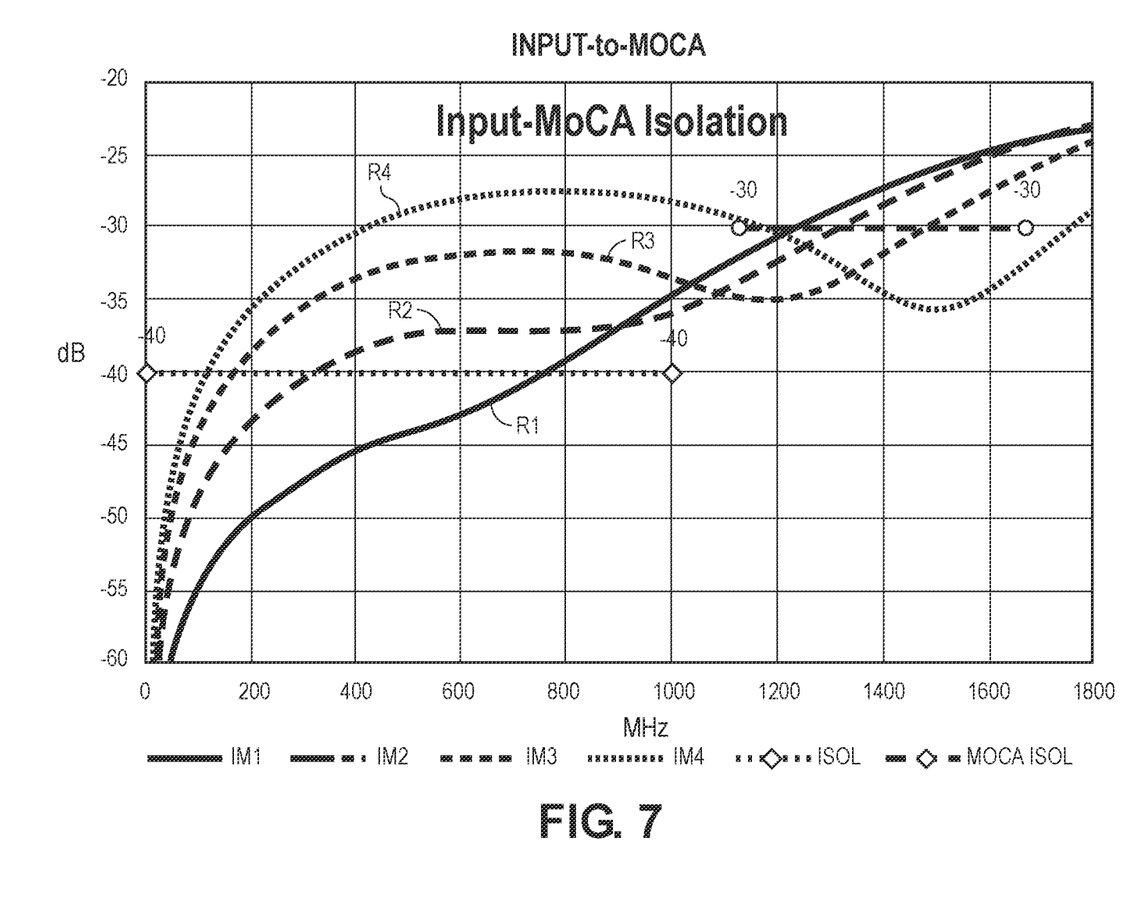
FIG. 7 illustrates a graph of the input port to MoCA-only port isolation for the Docsis-MoCA coupled line directional coupler, in accordance with aspects of the present disclosure.

FIG. 7 illustrates a graph of the input port to MoCA-only port (coupled port) isolation for the Docsis-MoCA coupled line directional coupler 100, 401, in accordance with aspects of the present disclosure. As can be seen in FIG. 7, the isolation is less than about 25 dB at the MoCA frequency band of about 1125-1675 MHz and less than about 35 dB at the Docsis frequency band of about 5 MHz to about 1002 MHz. In some embodiments, other isolation levels may be used. For example, an isolation level between the input port and the coupled port of less than about 40 dB at a Docsis frequency band may be used, and an isolation level between the input port and the coupled port of less than about 30 dB at a MoCA frequency band may be used. The coupling length can be set to provide other isolation levels as needed.

The coupled response between the input port and the coupled port can be skewed by selecting the proper resistive position or coupling length in conjunction with the series capacitance of the coupled port load (trace or component value). An objective is to provide a high isolation across the Docsis frequency band. In FIG. 7, R2 has the best frequency response in the Docsis frequency band. Additionally, R2 provides the most uniformity of the isolation level across the Docsis frequency band.

As shown in FIGS. 5-7, the Docsis-MoCA coupled line directional coupler 100, 401 may produce excellent results for the isolation levels and insertion loss in accordance with aspects of the present disclosure. Further, the results for the insertion loss and isolation levels can be adjusted by setting the coupling length between the first and second tracks of the Docsis-MoCA coupled line directional coupler as described herein. While other factors can affect the isolation levels and insertion loss, such as the track widths, the gap width between the tracks, the thickness of the PCB, a resistance value of the resistor connecting the second track to ground, etc., these other factors can be set to nominal values, such as those described herein, and then the coupling length can be set (by setting the connection position of the resistor along the length of the second track) to provide the Docsis-MoCA coupled line directional coupler with desired levels of isolation between the output port and the coupled port and between the input port and the output port at the Docsis and MoCA frequency bands. In addition, the coupling length can be set to provide increased uniformity of the isolation levels across the Docsis and MoCA frequency bands.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A coupler for providing an enhanced isolation comprising:
   an input port, an output port, a coupled port, and a termination port;
   a first track configured to connect the input port to the output port;
   a second track configured to connect the termination port to the coupled port
   wherein the first track and the second track are configured to form a variable resistor coupling length between the first track and the second track so as to control an isolation level between the output port and the coupled port to be less than a predetermined isolation level in a frequency band during operation of the coupler; and
   wherein the variable resistor coupling length is based on a position of a resistor relative to the second track such that when the resistor is located at a first position relative to the second track, the isolation level between the output port and the coupled port is less than the predetermined isolation level in the frequency band during operation of the coupler, and such that when the resistor is located at a second position relative to the second track that is different from the first position, the isolation level between the output port and the coupled port is greater than the predetermined isolation level in the frequency band during operation of the coupler.

2. The coupler of claim 1, wherein the coupler comprises a Docsis-MoCa coupled line directional coupler.

3. The coupler of claim 1, wherein the second track is configured to be substantially parallel to the first track.

4. The coupler of claim 1, wherein the predetermined isolation level between the output port and the coupled port is about 8 dB, and wherein the frequency band is about 1125-1675 MHz.

5. The coupler of claim 1, wherein the resistor is configured to be connected between a ground and the second track, and wherein the variable resistor coupling length is configured to be adjusted to allow the resistor to be connected to the second track at different positions along a length of the second track.

6. The coupler of claim 1, wherein a gap width between the first track and the second track and a width of the first track and a width of the second track are configured to control the isolation between the output port and the coupled port.

7. The coupler of claim 6, wherein the gap width is about 5.5 mil±1 mil, the width of the first track and the width of the second track about 14±1.5 mil, and the resistor has a resistance of about 75 ohms.

8. A coupler for providing an enhanced isolation to a coupled line comprising:
   an input port, an output port, a coupled port and a termination port;
   a first track configured to connect the input port and the output port;
   a second track configured to connect the first track the termination port to the coupled port;
   wherein the second track is configured to be substantially parallel to the first track;
   wherein the coupler comprises a directional coupler for a Docsis-MoCA coupled line;
   wherein the first track and the second track are configured to form a coupling length based on a resistor connection position relative to the second track;
   wherein the first track and the second track are configured to form a first coupling length, where the resistor connection position is spaced along the second track at a first connection position, and a second coupling length, where the resistor position is spaced along the second track at a second connection position that is different from the first connection position;
   wherein a coupling length between the first track and the second track is configured to provide an isolation level between the output port and the coupled port that is less than a first predetermined isolation level at a MoCA frequency band;
   wherein the coupling length between the first track and the second track is configured so that an isolation level between the input port and the coupled port is less than a second predetermined isolation level at a Docsis frequency band;
   wherein the coupling length between the first track and the second track is configured so that the isolation level between the input port and the coupled port is less than a third predetermined isolation level at the MoCA frequency band;
   wherein the coupling length between the first track and the second track is configured so that the insertion loss level between the input port and output port is less than a predetermined insertion loss level at a predetermined frequency; and wherein the first predetermined isolation level is about 8 dB and the MoCA frequency band is about 1125-1675 MHz.

9. The coupler of claim 8, wherein the predetermined insertion loss level is about 1.5 dB and the predetermined frequency is about 1200 MHz.

10. The coupler of claim 8, wherein the resistor is configured to be connected between a ground and the second track, wherein the coupling length is configured to be selectively adjusted by allowing the connection position of the resistor to the second track to be moved along a length of the second track.

11. The coupler of claim 10, wherein the insertion loss between the input port and the output port is less than about 1.5 dB at about 1125-1675 MHz, wherein the isolation level between the input port and the coupled port is less than about 35 dB at about 5-1002 MHz, and wherein the isolation level between the input port and the coupled port is less than approximately 25 dB at about 1125-1675 MHz.

12. The Docsis-MoCA coupled line directional coupler of claim 8, wherein a track width of the first track and the second track is about 14±1.5 mil, and a gap between first track and the second track is about 5.5±1 mil.

13. A coupler for providing an enhanced isolation to a Docsis-MoCA coupled line comprising:
an input port, an output port, a coupled port, and a termination port;
a first track configured to connect the input port and the output port;
a second track configured to connect the termination port to the coupled port;
wherein a coupling length between the first track and the second track is configured to provide an isolation level between the output port and the coupled port being that is less than a first predetermined isolation level at a frequency band during operation of the coupler;
wherein the coupling length between the first track and the second track is based on a resistor position relative to the second track;
wherein the coupling length between the first track and the second track is configured to provide an isolation level between the input port and the coupled port that is less than a second predetermined isolation level at a Docsis frequency band during operation of the coupler; and
wherein the coupling length between the first track and the second track is configured to provide an isolation level between the input port and the coupled port that is less than a third predetermined isolation level at the frequency band during operation of the coupler.

14. The coupler of claim 13, wherein the coupler comprises a directional coupler, and wherein the second track is configured to be substantially parallel to the first track.

15. The coupler of claim 13, wherein the first track and the second track are configured to form a first coupling length, where the resistor position is connected along the second track at a first position, and a second coupling length, where the resistor is connected along the second track at a second position that is different from the first position.

16. The coupler of claim 15, wherein when the first track, the second track and the resistor connection position form the first coupling length, the isolation level between the output port and the coupled port is less than the first predetermined isolation level at a MoCA frequency band during operation of the coupler.

17. The coupler of claim 15, wherein when the first track, the second track and the resistor connection position form the second coupling length, the isolation level between the output port and the coupled port is less than the second predetermined isolation level at a MoCA frequency band during operation of the coupler.

18. The coupler of claim 15, wherein the resistor has a resistance of about 75 ohms, wherein a track width of the first track and the second track is about 14±1.5 mil, wherein a gap between first track and the second track is about 5.5±1 mil, wherein the coupler comprises a single stage microstrip symmetrical coupled line directional coupler on an FR4 PCB, and wherein the PCB comprises a thickness of 39 mil, a dielectric constant of about 4.4, and a loss tangent of 0.015.

19. The coupler of claim 13, wherein the first predetermined isolation level between the output port and the coupled port is about 8 dB, wherein the MoCA frequency band is about 1125-1675 MHz, wherein the second predetermined isolation level between the input port and the coupled port is about 35 dB, wherein the third predetermined isolation level is about 25 dB, wherein the Docsis frequency band is about 5 to 1002 MHz, and wherein the insertion loss between the input port and output port is less than about 1.5 dB at about 1200 MHz.

20. The coupler of claim 13, further comprising a resistor connected between a ground and the second track, wherein the coupling length is configured to be adjusted by changing a resistor connection position along a length of the second track.

* * * * *